US008849859B2

(12) United States Patent
Schmidt et al.

(10) Patent No.: US 8,849,859 B2
(45) Date of Patent: Sep. 30, 2014

(54) HIERARCHICAL SYSTEM AND METHOD FOR ON-DEMAND LOADING OF DATA IN A NAVIGATION SYSTEM

(75) Inventors: Hauke Schmidt, E. Palo Alto, CA (US); Tuolin Chen, Mountain View, CA (US); Aaron Lee, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 614 days.

(21) Appl. No.: 11/975,459

(22) Filed: Oct. 19, 2007

(65) Prior Publication Data

US 2008/0091732 A1  Apr. 17, 2008

Related U.S. Application Data

(62) Division of application No. 10/334,240, filed on Dec. 31, 2002, now Pat. No. 7,305,396.

(51) Int. Cl.
| | |
|---|---|
| G06F 17/30 | (2006.01) |
| G06T 17/05 | (2011.01) |
| G01C 21/36 | (2006.01) |
| G06T 19/00 | (2011.01) |
| G06T 17/00 | (2006.01) |

(52) U.S. Cl.
CPC ............. G06T 17/005 (2013.01); G06T 17/05 (2013.01); G01C 21/3638 (2013.01); G06T 2210/12 (2013.01); G06T 19/003 (2013.01); G06T 2210/36 (2013.01); Y10S 707/99943 (2013.01); Y10S 707/99942 (2013.01)
USPC ........... 707/791; 707/608; 707/609; 707/706; 707/822; 707/999.102; 707/999.101

(58) Field of Classification Search
CPC ....................................................... G06F 17/30
USPC .................. 707/100, 102, 3, 101, 104.1, 956, 707/600–899; 709/217; 382/232
See application file for complete search history.

(56) References Cited

U.S. PATENT DOCUMENTS 5,953,722 A * 9/1999 Lampert et al. ............... 707/100
5,956,039 A   9/1999 Woods et al.
(Continued)

FOREIGN PATENT DOCUMENTS

JP   5303648    11/1993
JP   10312153   11/1998
(Continued)

OTHER PUBLICATIONS

"An Object-Oriented Conceptual Model for the Representation of Geographic Information"; Eliseo Clementini, Paolino Di Felice, and Alessandro D'Atri; Italy; 1991 IEEE.*

(Continued)

*Primary Examiner* — Isaac M Woo
(74) *Attorney, Agent, or Firm* — Kenyon & Kenyon LLP

(57) ABSTRACT

A system providing three-dimensional visual navigation for a mobile unit includes a location calculation unit for calculating an instantaneous position of the mobile unit, a viewpoint control unit for determining a viewing frustum from the instantaneous position, a scenegraph manager in communication with at least one geo-database to obtain geographic object data associated with the viewing frustum and generating a scenegraph organizing the geographic object data, and a scenegraph renderer which graphically renders the scenegraph in real time. To enhance depiction, a method for blending images of different resolutions in the scenegraph reduces abrupt changes as the mobile unit moves relative to the depicted geographic objects. Data structures for storage and run-time access of information regarding the geographic object data permit on-demand loading of the data based on the viewing frustum and allow the navigational system to dynamically load, on-demand, only those objects that are visible to the user.

17 Claims, 15 Drawing Sheets

(56) References Cited

U.S. PATENT DOCUMENTS

| | | | |
|---|---|---|---|
| 6,370,539 B1 * | 4/2002 | Ashby et al. | 707/102 |
| 6,433,790 B1 | 8/2002 | Taylor et al. | |
| 6,505,205 B1 * | 1/2003 | Kothuri et al. | 707/100 |
| 6,507,850 B1 * | 1/2003 | Livshutz et al. | 707/104.1 |
| 6,747,649 B1 | 6/2004 | Sanz-Pastor et al. | |
| 6,985,929 B1 * | 1/2006 | Wilson et al. | 709/217 |
| 7,080,065 B1 * | 7/2006 | Kothuri et al. | 707/3 |
| 7,266,560 B2 * | 9/2007 | Lampert et al. | 707/101 |
| 2001/0043745 A1 * | 11/2001 | Friederich et al. | 382/232 |
| 2002/0063713 A1 | 5/2002 | Sowizral et al. | |
| 2002/0091758 A1 | 7/2002 | Singh et al. | |
| 2002/0118224 A1 | 8/2002 | Levanon et al. | |
| 2003/0204513 A1 | 10/2003 | Bumbulis | |
| 2004/0160441 A1 | 8/2004 | Lokovic et al. | |

FOREIGN PATENT DOCUMENTS

| | | |
|---|---|---|
| JP | 2001229402 | 8/2001 |
| WO | WO 01/48697 | 7/2001 |
| WO | WO 01/80568 | 10/2001 |

OTHER PUBLICATIONS

"Virtual GIS: A Real-Time 3D Geographic Information System"; David Koller, Peter Lindstrom, William Ribarsky, Larry F. Hodges, Nicke Faust, and George Turner; IEEE 1995.*

European Search Report, EP 03026676, dated May 10, 2010.

* cited by examiner

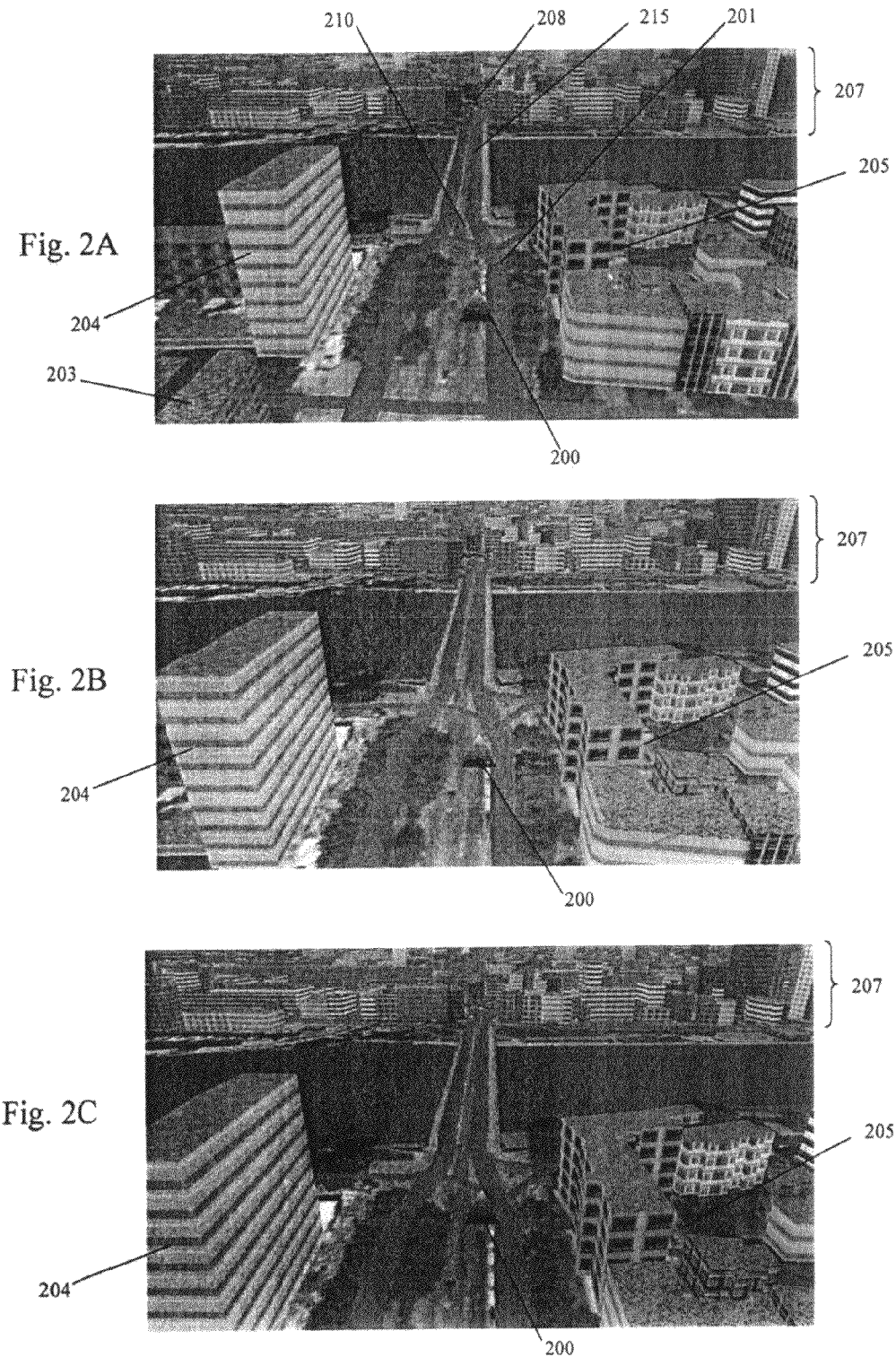

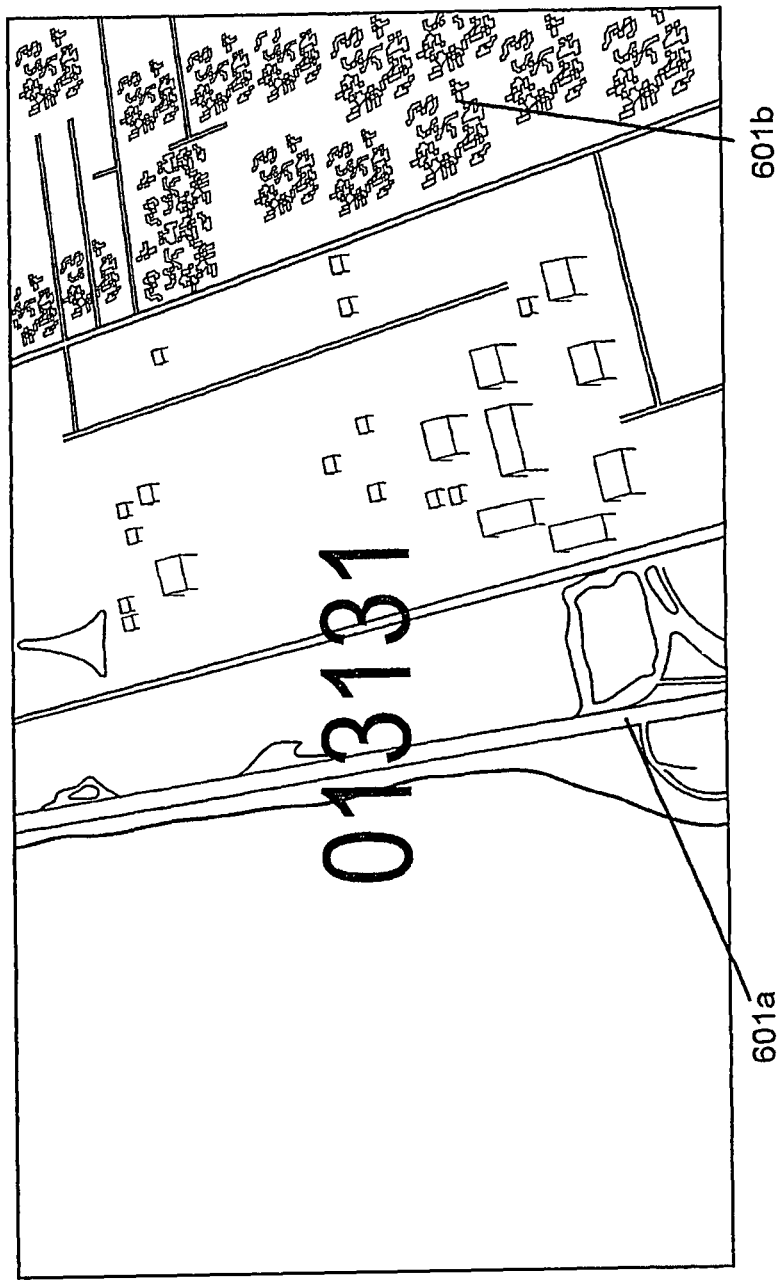

HIERARCHICAL SYSTEM AND METHOD FOR ON-DEMAND LOADING OF DATA IN A NAVIGATION SYSTEM

CROSS-REFERENCE TO RELATED APPLICATIONS

This application is a Divisional Application of prior U.S. Patent Application Ser. No. 10/334,240 filed Dec. 31, 2002 now U.S. Pat. No. 7305396, all of which is incorporated herein by reference in its entirety.

FIELD OF THE INVENTION

The present invention relates to visual navigation systems, and relates more particularly to a system and method for visual display of geographically referenced data for mobile navigation, which includes a hierarchical method for on-demand loading of graphic landmark objects, and a method for multiresolution image synthesis to more efficiently and accurately depict local geographic environments.

BACKGROUND INFORMATION

Using computer graphics software to accurately visually render the appearance of a local geographic environment in the view of a fixed observer (from a particular viewpoint chosen by the observer) is in itself a challenging task because of the difficulties involved in accurately simulating the various textures and graphical details of a scene in addition to the problems of reconstructing a scene according to the observer's viewpoint. However, modern visual navigation systems under current development place a far greater demand on graphics software: to accurately simulate the visual environment of a moving observer to serve as a navigational aid. Using rendering software to depict the local geographic environment of a moving observer, such as a driver in a vehicle, in real-time is obviously far more challenging than rendering the environment of a fixed observer, because as the location of the observer changes, the geographic objects within his or her viewing horizon and the appearance of these objects change, requiring a continual updating mechanism by which new graphical objects (local "points of interest"), textures, features and views and other reference data can be readily downloaded to accurately render and provide information pertaining to the local navigated environment in real time.

Some visual navigation systems currently in use provide three-dimensional visualizations of real environments based on user input, but these systems either do not support mobile navigation, and thus do not provide route guidance applications for navigational assistance, or are limited in terms of the renderable viewpoint or the graphical features that can be displayed.

What is therefore needed is a visualization system for mobile units, such as motor vehicle navigation systems or personal digital assistants (PDAs), that realistically renders the environment of a mobile observer with a high degree of detail according to any viewpoint, and also provides navigational aids such as route guidance and reference information pertinent to displayed objects.

SUMMARY OF THE INVENTION

To meet the needs noted above, the present invention provides a system for providing three-dimension visual navigation for a mobile unit that includes a location calculation unit for calculating an instantaneous position of the mobile unit, a viewpoint control unit for determining a viewing frustum based on the instantaneous position of the mobile unit, a scenegraph manager in communication with at least one geo-database that obtains geographic object data associated with the viewing frustum from the at least one geo-database and generates a scenegraph that organizes the obtained geographic object data, and a scenegraph renderer which graphically renders the scenegraph as three-dimensional depiction in real time.

To enhance the realism of the depiction, the present invention provides a method for blending images of different resolutions pertinent to the viewing frustum in order to reduce unevenness and abrupt changes in the resulting depiction which would otherwise occur as the mobile unit moves closer toward, or further away from the depicted geographic area.

In addition, to increase the efficiency of the navigational visualization, the present invention also describes data structures for storage and run-time access of information regarding geographic landmark objects or POIs (Points of Interest). The data structures may permit on-demand loading of the objects based on the viewing frustum and/or a user request. The data structures may minimize the loading time, memory usage, processing requirements and display rendering resources by allowing the system to dynamically load, on-demand, only those objects that are visible and/or of interest to the user of the mobile unit.

BRIEF DESCRIPTION OF THE DRAWINGS

FIG. 1b is a schematic illustration of a viewing frustum according to a slightly changed orientation from the illustration shown in FIG. 1a.

FIG. 2a is an exemplary three-dimensional rendering of a metropolitan environment in a helicopter view in accordance with the current location of the mobile unit provided by the present invention.

FIG. 2b is a three-dimensional helicopter view rendering of the environment of FIG. 2a after the mobile unit has moved a distance along the illustrated route.

FIG. 2c is a three-dimensional helicopter view rendering of the environment of FIG. 2a and FIG. 2b after the mobile unit has moved still further along the illustrated route.

FIG. 5b shows a hierarchical tree-like structure representing the nested bounding box relationship of FIG. 5a.

FIG. 8b shows a second blended multiresolution image according to the present invention as viewed from a smaller distance than for FIG. 8a.

FIG. 8c shows a third blended multiresolution image according to the present invention as viewed from a smaller distance than for FIG. 8b.

DETAILED DESCRIPTION

A system in accordance with the present invention generates a sequence of three-dimensional graphic visualizations, from an arbitrary viewpoint, of geographic areas for mobile navigation, orientation and reference. The graphic visualizations, or renderings, can contain representations of any type of data object for which local geographic information is available. Such data may include (without limitation) satellite, aerial, or ground view images, digital road maps, geometric models of buildings, textural descriptions of landscapes, and any kind of identification information that describes features or buildings in the depicted environment such as gas stations and hotels, or dynamic data, such as traffic information, weather conditions, and time of day (lighting).

Figure 1A:
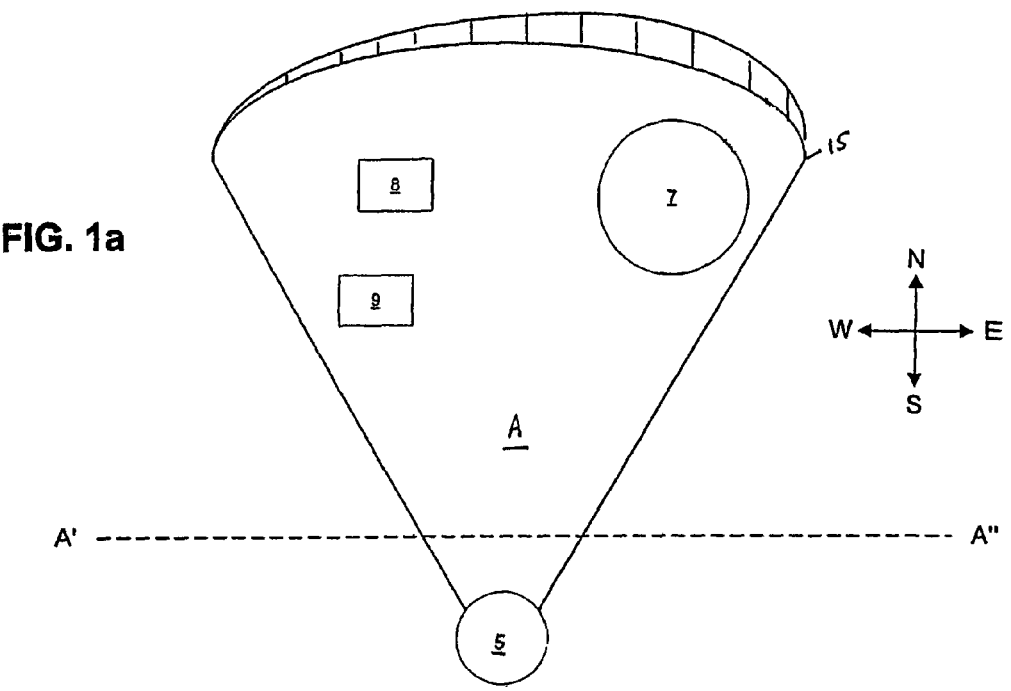
FIG. 1a is a schematic illustration of the viewing frustum of an observer according to a first orientation.
Figure 1B:
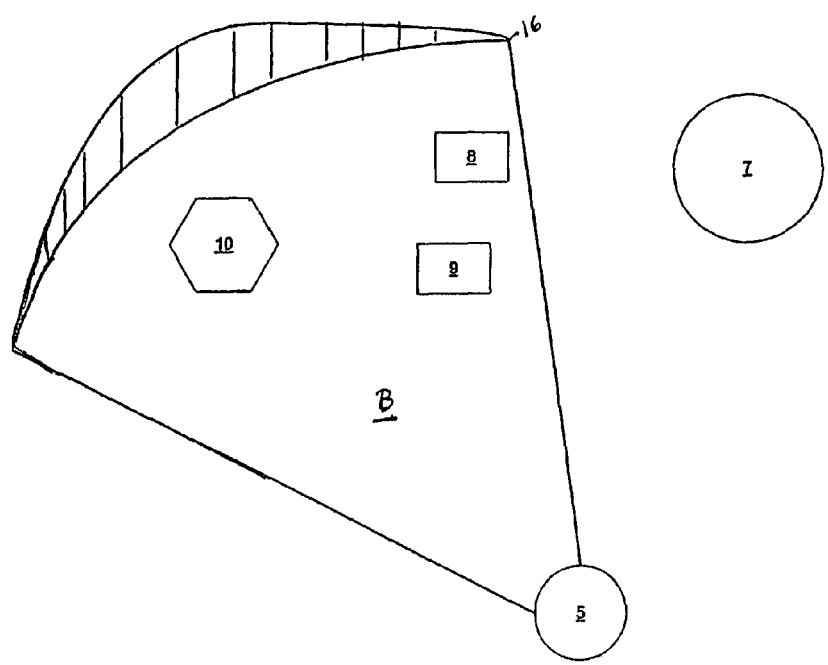

FIG. 1a and FIG. 1b illustrate how the informational parameters used to render the local environment change with the viewpoint (orientation) of the observer. In FIG. 1a, an observer 5 oriented "north" has a two-dimensional field of vision A, an approximately cone-shaped area that includes objects 7, 8 and 9. The field of vision A determines a three-dimensional "viewing frustum" 15 that includes all of the three-dimensional space the observer can perceive. The objects within the viewing frustum 15 are projected onto a two-dimensional view (schematically illustrated as plane A'-A") in accordance with known rules of perspective, human vision, and graphic depiction. When the observer 5 turns toward the "west" by a small angle, his or her viewing horizon encompasses a new field of vision B that overlaps a portion of field of vision A, and defines a changed viewing frustum 16. The new viewing frustum 16 encompasses a new object 10, while object 7 is outside of the new viewing frustum and is no longer viewable.

Thus, in order to properly render the observer's environment as his orientation changes, the rendering system must retrieve and render new data (regarding object 10) that was not previously rendered, and must put aside data (regarding object 7) that was previously retrieved and rendered. In this manner, the system is in continual flux as it downloads new information and puts aside "old" data. Since the amount of geographical graphic data typically far exceeds the capacity of on-board memory resources for most visual navigation systems, it is vital for the system to have rapid and efficient access to off-board database resources so that new data can be immediately downloaded for rendering successive sequences in real-time that match what the observer's sees to the greatest extent possible. To achieve a high degree of realism, the visualization system updates the visualization at a rate of up to 60 updates per second, fast enough to make the changes appear seamless and immediate to the human eye.

FIGS. 2a, 2b and 2c show three sequential three-dimensional renderings of a metropolitan environment as an observer travels along a depicted route, illustrating how the visual navigation system of the present invention takes into consideration the observer's movement and updates the visualization accordingly. FIG. 2a depicts a "helicopter" view rendering of a scene in a metropolitan area based on the location of the mobile unit 200, illustrated as green triangle. As shown, the mobile unit, which may be incorporated in a motor vehicle, is moving along a road 201 between buildings 203, 204 (shown on the left) 205 (shown on the right) in the foreground and approaching a bridge 215. The depiction also includes reference text identifying the bridge as the "James Monroe" bridge. A background section 207, including several buildings, lies at the far end of the bridge 215. A yellow triangular compass 208 which indicates the direction of geographic north, is shown at the top, directly above the mobile unit 200. In addition, a suggested route to a pre-selected destination is shown as a blue curved line 210.

As the mobile unit 200 moves forward toward the bridge 215 along the suggested route 210, the graphical rendering of the local environment changes slightly, as shown in FIG. 2b. As can be discerned, the representation of the mobile unit 200 has moved forward, the background section 207 has enlarged slightly, and the buildings 203-205 have enlarged in proportion, in accordance with rules of perspective. As the mobile unit moves still further toward the bridge 215 as shown in FIG. 2c, the building in the foreground 203-205 and background 207 enlarge still further. In addition, portions of building 205 formerly hidden from view now appear, and building 203 disappears, simulating what an observer would view as he or she moved forward along route 210.

Figure 3:
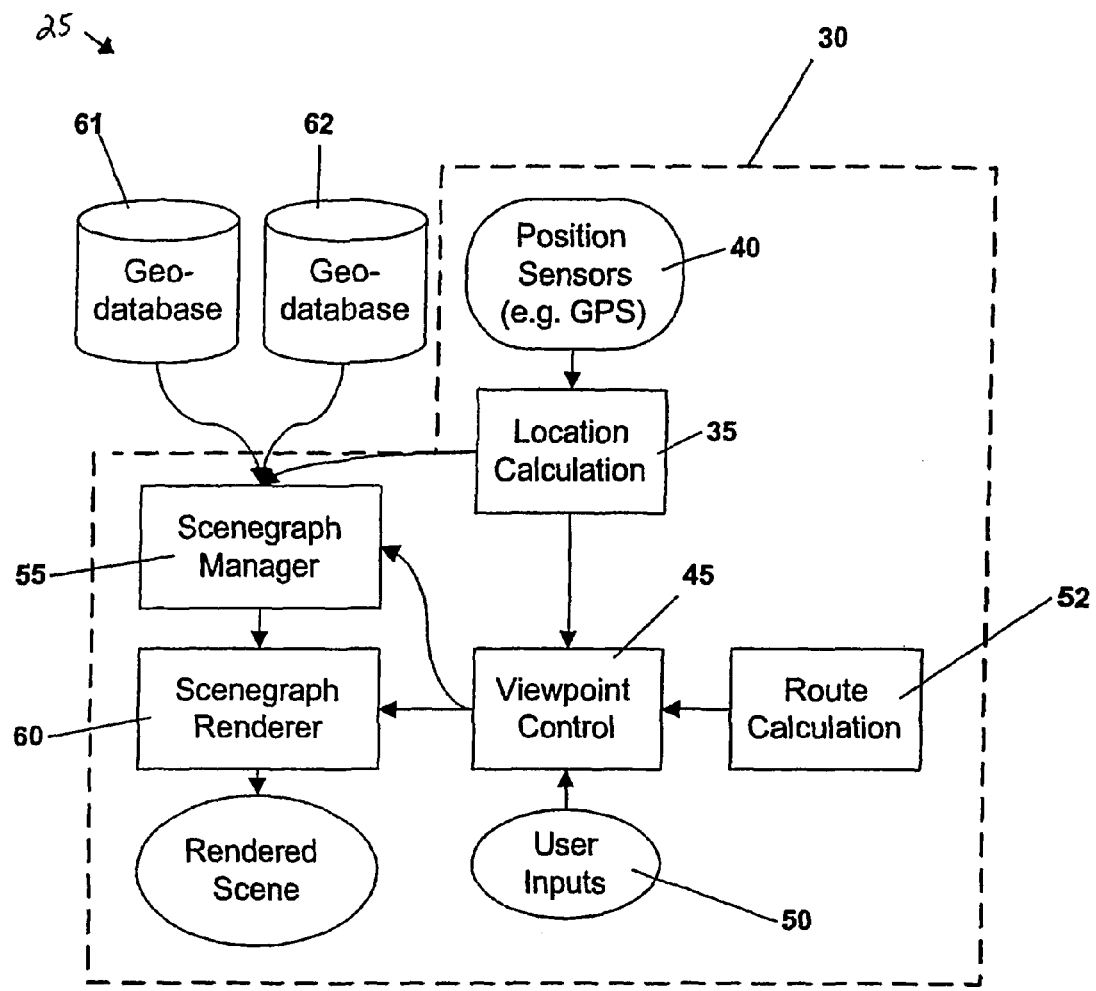
FIG. 3 shows the visual navigation system according to an exemplary embodiment of the present invention.

FIG. 3 is a block diagram of the navigational system for advanced three-dimensional visualization according to an exemplary embodiment of the present invention. The navigational system 25 includes both on-board components 30 co-located with the mobile unit, and off-board components located remotely such as geographical databases ("geo-databases") 61, 62. It is understood that while geo-databases 61, 62 are illustrated as two discrete units, they are intended to represent an arbitrary number of databases, co-located or remotely located, that can be accessed by the on-board 30 components of the system. The geo-databases 61, 62 contain the large amount of data pertaining to various geographical areas including map information, geometrical and texture graphics information, and identification information. However, each geo-database may alternatively contain only references, or meta-data, pertaining to graphics information that is physically stored in other databases. In this manner, a particular database may function as a directory server for accessing further databases that can be queried efficiently to provide information such as the objects of a certain type, e.g., restaurants, that are located within a specific geographic area. The use of geo-database meta-data for streamlining access to data will be described in greater detail below.

The visual navigation system 25 includes a location calculation unit 35 that may be implemented as a program stored in local memory and executed on a microprocessor of the mobile unit (which is taken to be the position of the observer). The location calculation unit 35 receives input from position sensors 40 and calculates an instantaneous position (coordinates) of the mobile unit in Cartesian (x,y,z) space based upon the input information. According to one embodiment, the position sensors 40 include both GPS receivers which provide "absolute" position information and inertial sensors which may provide linear acceleration and angular velocity information from which "relative" position information can be calculated by integration. Alternatively or additionally, the position sensors 40 may include odometric sensors such as wheel speed sensors. When equipped with appropriate inertial sensors responsive to rotational movement, the location calculation unit can also calculate instantaneous orientation of the mobile unit.

The location calculation unit 35 passes the calculated position (and possibly orientation) of the mobile unit to a viewpoint control unit 45 which uses the position information and orientation information to determine the bounds of the viewing frustum to be rendered. The viewpoint control unit 45 also interacts and receives input from user input module 50 and a route calculation module 52 to provide enhanced functionality. For example, through the user input module 50, such as a keypad or button controls, a user of the visualization system can change the viewing mode to zoom out/in or change the pitch angle of observation. Additionally, the user may be able to override the location calculation unit 35 through the user inputs 50 in order to specify different location and orientation parameters for visualization.

The user can also select an observational viewpoint mode via the user inputs 50. In one mode, the viewpoint rendered may represent a "helicopter" view that follows the location of the mobile unit at a specific predetermined distance and angle, similar to the way a helicopter might follow a car. In another mode, the viewpoint may directly reflect the position and heading of the mobile unit such that the virtual scene matches the scene the observer sees. In each case, the selected mode affects the viewing frustum calculated by the viewpoint control unit 45.

If a route calculation module 52 is installed in the system (as shown), it may provide route information such as decision points (e.g., intersections) along a selected route. If a preview mode is selected via the user inputs 50, transmission of decision points information from the route calculation module 52 to the viewpoint control unit 45 can trigger the viewpoint to an upcoming decision point so that a visualization of the upcoming section of the route is presented to the user in preview before the mobile unit arrives at that section.

After the viewpoint control unit 45 determines the viewing frustum according to the currently selected viewing mode, it provides the viewing frustum coordinates to a scenegraph manager module 55, which organizes and accesses the data storage objects. The scenegraph manager module 55 maintains a structured description of all of the objects that are to be depicted in the current scene referred to as a "scenegraph." The scenegraph manager 55 determines a geographical area of interest based on the viewing frustum received from the viewpoint control unit 45 and then queries the geo-databases 61, 62 for objects that lie within this geographical area. New objects are incorporated into the scenegraph, while objects that no longer lie within the geographical area of interest are removed from the scenegraph. User inputs, entered via the user input module 50, may be used to filter or select the types of objects that the scenegraph manager 55 includes in the scenegraph. For example, the user may specify that only restaurants be depicted. The scenegraph manager will then query and add objects to the scenegraph that match these criteria. In addition, the scenegraph continually contains an object representing the mobile unit itself.

In order to minimize the loading time, memory usage, processing requirements and display rendering resources, the scenegraph manager 55 may dynamically load on demand from the geo-databases 61, 62 only those data storage objects that are visible and/or of interest to the user and that are associated with the particular level of detail. To query the geo-databases 61, 62 to obtain this information, the scenegraph manager 55 employs a hierarchical method for on-demand loading of object data which uses specifically defined data structures to organize the object data for efficient access.

In an exemplary embodiment of the present invention, two data structures may be used as a guide for loading the landmark objects on-demand. The first data structure, referred to as the Resource Index File or simply the "RIF file", may provide storage for "meta-data" of the landmark objects. The second data structure, referred to as the Level of Detail file or simply the "LOD file", may store "actual data" pertaining to the landmark objects in multiple levels of detail. The RIF and/or the LOD file may be stored, for example, in a storage medium and/or computer memory.

The meta-data stored in the RIF file may assist the scenegraph manager in determining which resources are visible at a particular viewpoint and their level of detail. The meta-data may be small in size in comparison to the actual data. Therefore, by separating the meta-data from the actual data, memory usage, processing requirements, and initial application start-up time may be significantly reduced because the actual data may not need to be loaded until it is required. For example, during the initialization phase of the navigation system, the RIF file may be read to determine which resources are required to be loaded into the system memory without loading the actual data. During run-time, the scenegraph manager may access the actual data via the LOD file based on information stored in the RIF file (i.e., the meta-data stored in the RIF file may serve as a directory to determine which portion of the actual data is to be loaded into system memory).

The actual data stored in the LOD file may represent information regarding the resources of the system in multiple resolutions. Unlike conventional systems, which typically store actual data as leaf nodes only at non-intermediate levels of a hierarchical tree-like structure, the LOD file may provide storage of the data in the intermediate nodes as well. In this manner, the hierarchical tree-like structure may provide a more suitable arrangement to access the multi-resolution information by allowing a more selective loading of the required data for a particular resolution at a given viewpoint configuration. For example, a 100 m resolution texture at 10000 ft viewpoint may be selected more immediately rather than 1 m resolution since the arrangement of the data may avoid unnecessary traversing. Thus, by arranging the data to be distributed among all levels of a hierarchical tree-like structure, a more expedient and efficient access of data may be achieved for the required resolution.

Figure 4B:
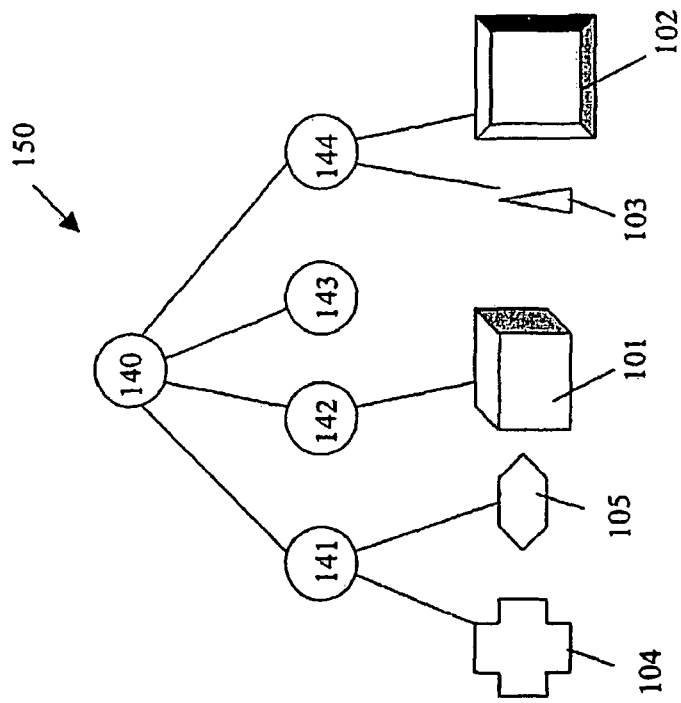
FIG. 4b shows a tree-like structure representing the spatial partitioning of the bounded area of FIG. 4a and the location of landmark objects within the bounded area.
Figure 4A:
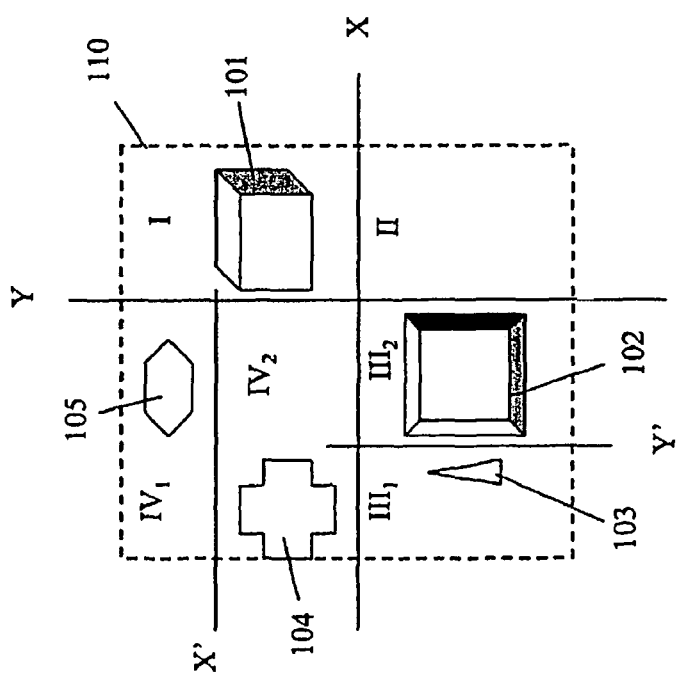
FIG. 4a shows an abstract representation of landmark objects geographically dispersed in a two-dimensional area.

FIG. 4a shows an abstract representation of landmark objects 101-105 geographically dispersed in a two-dimensional area bounded by the dotted line 110. Coordinates X, Y, X', and Y' further delineate the bounded area 110. More specifically, coordinates X and Y intersect with each other to divide the bounded area 110 into four quadrants—i.e. a first quadrant I, a second quadrant II, a third quadrant III, and a fourth quadrant IV. Coordinates X' and Y' intersect with coordinates X, Y to further subdivide two of the four quadrants into sub-quadrants. In particular, coordinate Y' intersects coordinate X to subdivide quadrant III into sub-quadrant $III_1$ and sub-quadrant $III_2$. Coordinate X' intersects with coordinate Y to subdivide quadrant IV into sub-quadrant $IV_1$ and sub-quadrant $IV_2$.

The subdivision of the bounded area 110 into quadrants I-IV and sub-quadrants $III_1$, $III_2$, $IV_1$, and $IV_2$, facilitates a more accurate description of the location of the landmark objects 101-105. As shown in FIG. 4*a*, landmark(geographic) object 101 is located in first quadrant I, landmark object 102 is located in sub-quadrant III$_2$, landmark object 103 is located in sub-quadrant III$_1$, landmark object 104 is located in sub-quadrant IV$_2$, and landmark object 105 is located in sub-quadrant IV$_1$.

The description of the location of landmark objects 101-105 may also be represented as a "tree-like" structure with a "root node" and a number of "branch nodes" and "leaves". The branch nodes may represent the spatial partitioning of the bounded area 110 and the leaves may represent the landmark objects 101-105. The branch nodes and leaves may be specifically arranged to form a relationship between the spatial partitioning of the bounded area 110 and the location of the landmark objects 101-105. In particular, the branch nodes and leaves may be arranged in a hierarchical manner—i.e. the branch nodes may be arranged to be "children" of the root node or of another branch node and the leaves may be arranged to be "children" of a branch node.

FIG. 4*b* shows an exemplary embodiment of a tree-like structure 150 to represent the spatial partitioning of the bounded area 110 as well as the location of landmark objects 101-105 within the bounded area 110. The tree-like structure 150 includes a root node 140, four branch nodes 141-144, and the five landmark objects 101-105. The root node 140, the branch nodes 141-144, and the five landmark objects 101-105 are arranged in a hierarchical manner. In particular, root node 140 is arranged to be at the "base" or "root" of the tree-like structure 150, branch nodes 141-144 are arranged to be "children" of the root node 140, and the five landmark objects 101-105 are arranged to be "leaves". The five landmark objects 101-105 are additionally arranged to be "children" of the branch nodes 141-144. In particular, landmark object 101 is arranged to be a child of branch node 142, landmark objects 103 and 102 are arranged to be children of branch node 144, and landmark objects 104 and 105 are arranged to be children of branch node 141.

Such a hierarchical arrangement of the tree-like structure 150 may provide a suitable framework for constructing a data structure that may be useful in navigational systems, for example. In particular, the hierarchical arrangement of tree-like structure 150 may be easy to create, parse, and navigate. Furthermore, the hierarchical arrangement of the tree-like structure 150 may allow a "quick rejection" test to be performed wherein a branch node of the tree may be "pruned" if the landmark object at that node is outside the viewing frustum of the navigation. For example, if a user of the navigational system is deemed to be in the first quadrant I, the landmark object 101 may be assumed to be within the user's viewing frustum while the landmark objects 102-105 may be assumed to be outside the user's viewing frustum. As such, the branch node associated with the first quadrant I, i.e. branch node 142, may be "loaded" while the other branch nodes, i.e. branch nodes 141, 143, and 144, may be "pruned" and subsequently need not be visited. Thus, the hierarchical arrangement of the tree-like structure 150 may permit loading of the actual data (landmark objects or Points of Interests POI) on-demand as a function of the present view or request of the user.

In an exemplary embodiment of the present invention, each node of the tree-like structure 150 may provide information regarding a geographic area of the system. In particular, each node of the tree-like structure 150 may be associated with a "bounding box" (i.e. a bounded area, a quadrant, a sub-quadrant, etc.) which may be subdivided by one or more "tiles". A tile is a logical unit containing a set of features and associated data for a particular location within a bounding box. The features may include, for example, a road sign, a building, or an aerial photograph. The associated data may include a description of the features within the tile (e.g. how many polygons of a building, how many sides in each polygon and their (x,y,z) coordinates etc.).

Figure 5A:
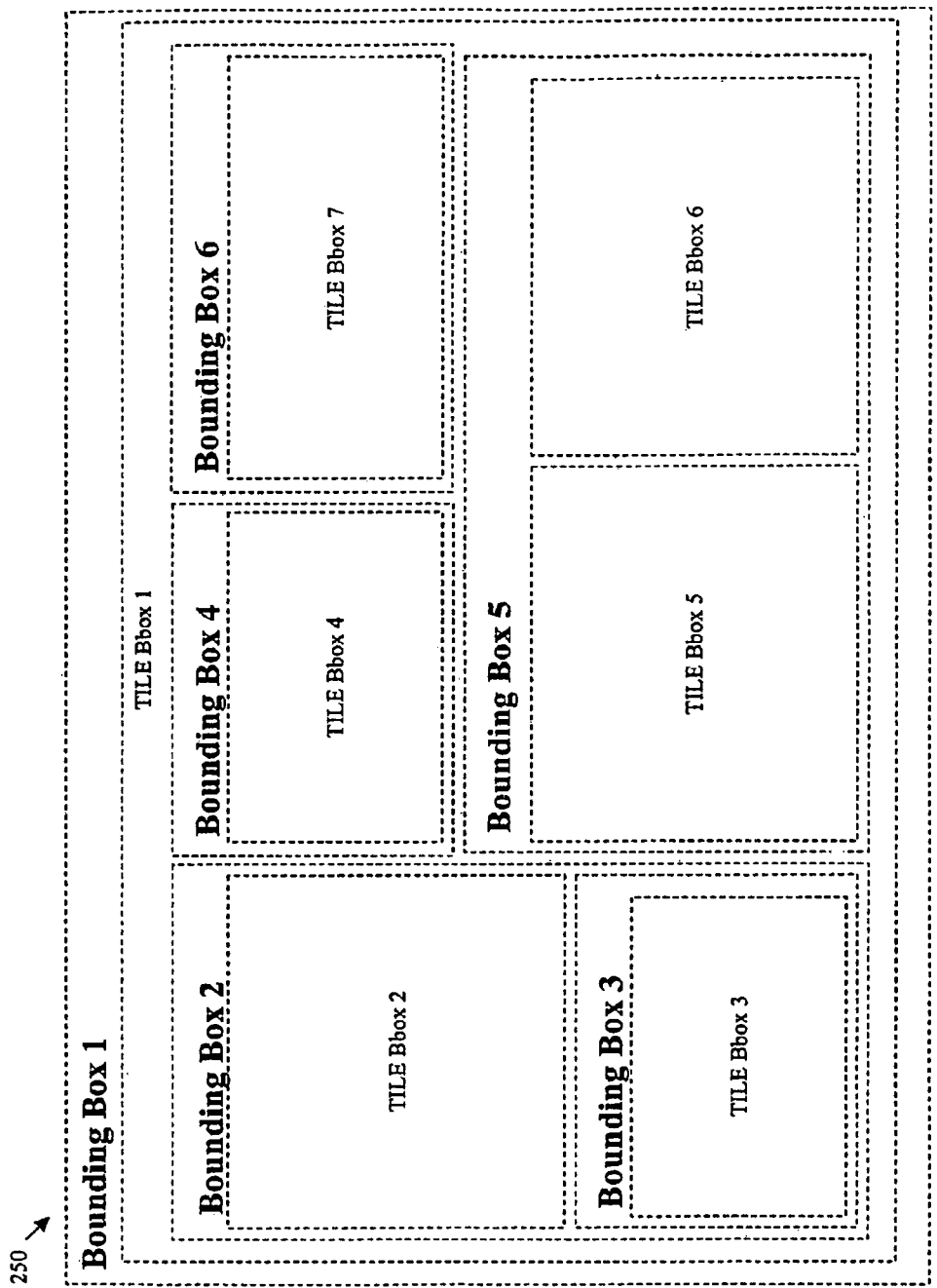
FIG. 5a shows an exemplary abstract representation of a 2-dimensional geographically bounded area of a navigation system demonstrating a nested relationship between bounding boxes and tiles.

FIG. 5*a* demonstrates the "nested" relationship between bounding boxes and tiles. FIG. 5*a* shows an exemplary abstract representation 250 of a 2-dimensional geographically bounded area of a navigation system demonstrating the nested relationship between bounding boxes and tiles. A Bounding Box 1 defines the north, south, east, and west boundaries of the entire system. The Bounding Box 1 is subdivided to include bounding boxes 2 through 6, each including one or more tile bounding boxes. In particular, Bounding Box 2 includes TILE Bbox 2, Bounding Box 3 includes TILE Bbox 3, Bounding Box 4 includes TILE Bbox 4, Bounding Box 5 includes TILE Bbox 5 and TILE Bbox 6, and Bounding Box 6 includes TILE Bbox 7.

Figure 5B:
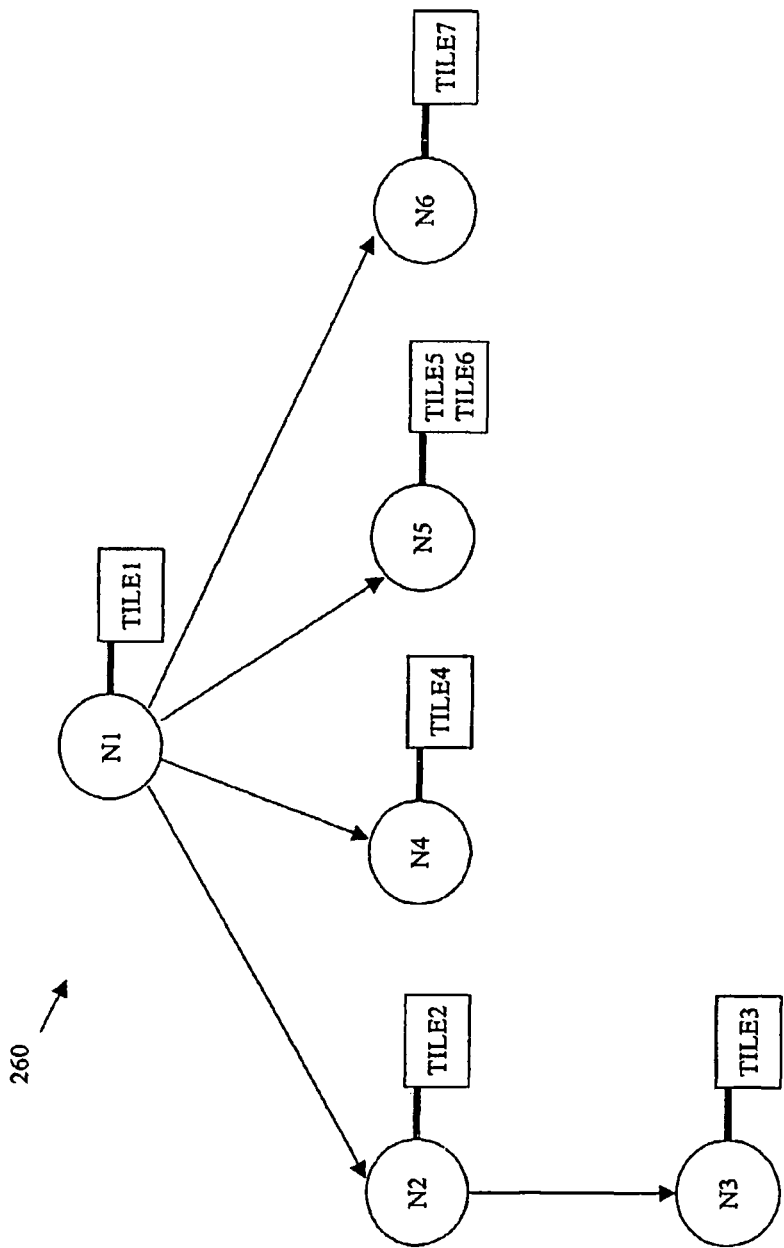

FIG. 5*b* shows a hierarchical tree-like structure 260 for representing the nested bounding box relationship of FIG. 5*a*. The tree-like structure 260 includes nodes N1 through N6, each associated with a particular bounding box 1 through 6. In particular, node N1 is associated with Bounding Box 1, node N2 is associated with Bounding Box 2, node N3 is associated with Bounding Box 3, node N4 is associated with Bounding Box 4, node N5 is associated with Bounding Box 5, and node N6 is associated with Bounding Box 6. The nodes N1 through N6 are arranged in a hierarchical manner to represent the nested relationship of bounding boxes 1 through 6. In particular, node N1 is arranged to be at the base or root of the tree-like structure 260 representing the associated Bounding Box 1 as encompassing the entire geographical area of the navigation system. Additionally, nodes N2, N4, N5, and N6 are arranged to be "children" of the root node N1 representing that associated bounding boxes 2, 4, 5, and 6 lie within Bounding Box 1. Furthermore, node N3 is arranged to be a child of node N2 representing that associated bounding box 3 lies within bounding box 2.

Nodes N1 through N6 each have one or more attached tiles TILE1 through TILE7 representing the nested relationship of associated tile bounding boxes TILE Bbox 1 through TILE Bbox 7. In particular, TILE1 is attached to node N1 representing that associated TILE Bbox 1 lies within Bounding Box 1, TILE2 is attached to node N2 representing that associated TILE Bbox 2 lies within Bounding Box 2, TILE3 is attached to N3 representing that associated TILE Bbox 3 lies within Bounding Box 3, TILE4 is attached to node N4 representing that TILE Bbox 4 lies within Bounding Box 4, TILE5 and TILE6 are attached to node N5 representing that associated TILE Bbox 5 and TILE Bbox 6 lie within Bounding Box 5, and TILE7 is attached to N6 representing that associated TILE Bbox 7 lies within Bounding Box 6.

The set of features and associated data for tiles, i.e. the tile data, may be kept separate from the data that describes the dimensions of the tile and/or the parent-child relationship of the tree-like structure. Such a separation of feature-related data (actual data) from the hierarchical data (meta data) may provide an overall improvement in performance. In particular, the separation may allow fast rejection/acceptance within the user's visible space. For example, if the meta data associated with a tile includes a bounding box as specified by four numbers, which define north, south, east, west boundaries, an intersection or overlap may be readily determined. As such, a tile may be accepted or rejected without investigating each of the features it may contain. Hence, the features of a tile need not be examined in order to determine that such features are within or outside the field of vision of the navigation. Furthermore, changing the actual data may not affect the indexing of meta data since the actual feature data is independent of the meta data.

In an exemplary embodiment of the present invention, the separation of the meta data and the actual data may be implemented via two data structures, namely a Resource Index File (RIF) and a Level of Detail (LOD) file.

The following Table 1 describes an exemplary format of the RIF file:

| | |
|---|---|
| URL | String |
| Dimension | {2 \| 3} |
| Bbox | [floats]$^{2*Dimension}$ |
| Tiles | { #Tiles, [TileID, Bbox]$^{\#Tiles}$ } |
| Nchildren | { #Children, [Bbox, Tiles, Nchildren]* } |

As shown in Table 1, the RIF may include a "URL" field, a "Dimension" field, a "Bbox" field, a "Tiles" field, and a "Nchildren" field. The URL field is a string defining the location of the RIF file, which may be a local file or a remote object. The Dimension field may be either a "2", indicating a 2-dimensional roadmap, or a "3", indicating a 3-dimensional roadmap. The Bbox field includes a list of floating point numbers, which define the upper bound and lower bound in each dimension of the bounding box for an associated node. The Tiles field is a number followed by a series of tuples, the number indicating the quantity of tiles for an associated node, the series of tuples including a "TileID" and a Bbox for each tile. (i.e., the bounding box being thus defined on a per-tile basis). The Nchildren field is a number followed by a series of tuples, the number indicating the quantity of children associated with an associated node, the tuple including a Bbox field, a Tiles field, and a Nchildren field to recursively define each child's bounding box, associated tiles, and number of children.

Figure 6A:
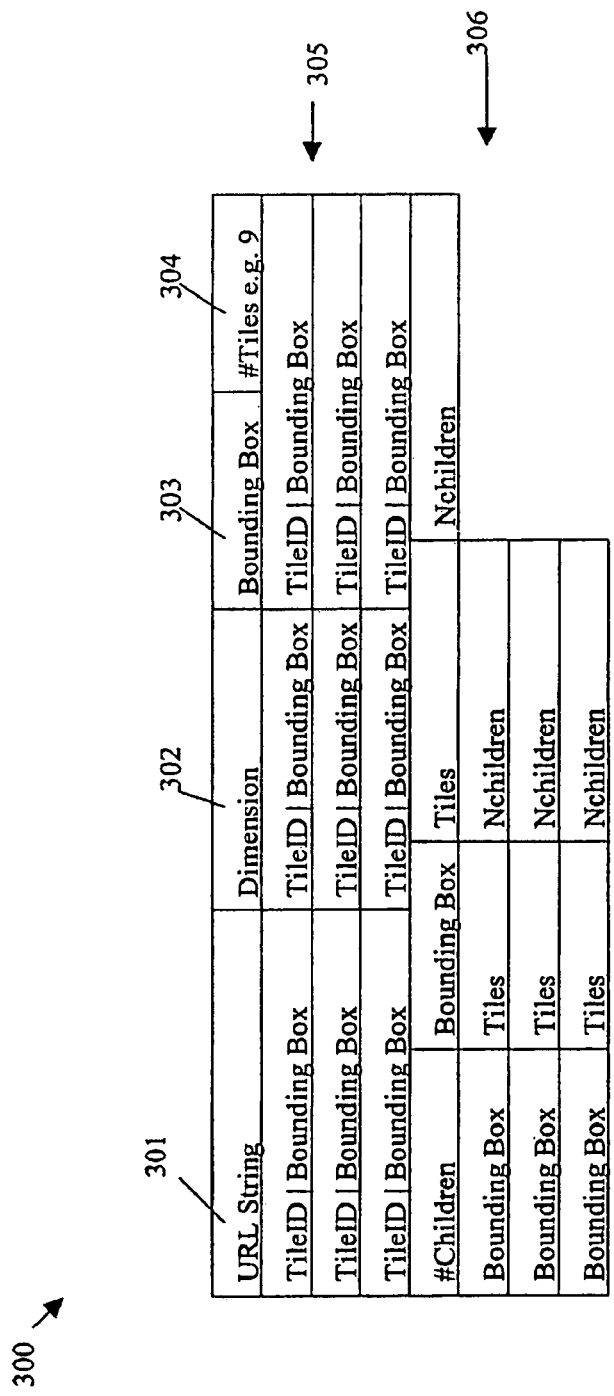
FIG. 6a shows an exemplary representation of the physical layout of the Resource Index Filed (RIF) within a storage medium or memory according to an embodiment of the present invention.

FIG. 6a shows an exemplary representation of the physical layout of the RIF file within a storage medium or memory. The RIF file 300 may be stored as a sequence of contiguous bytes, which may be interpreted according to the structure as defined in Table 1. For example, the URL field 301 occupies the initial portion of memory, the Dimension field 302 occupies the next portion of memory, followed by a Bounding Box field 303, a number of tiles field 304, a sequence of Tile ID/Bounding Box pairs 305, and a recursive sequence of a number of children, a Bounding Box and Tile fields 306.

Figure 6B:
FIG. 6b shows exemplary contents of the RIF file corresponding to the hierarchical tree-like structure of FIG. 5b.

FIG. 6b shows exemplary contents 350 of the RIF file corresponding to the hierarchical tree-like structure 260 of FIG. 5b. More specifically, contents 350 specify that the RIF file is located under /bosch/resources/tiles, that bounding boxes of the navigation system describe geographically areas in two (2) dimensions; that the root node is associated with Bounding Box 1 which includes one tile (#Tiles=1) having a TileID 1 which is associated with Tile BBox 1; that the root node includes four children (#Children=4); that the first child of the root node is associated with Bounding Box 2 which includes one tile (#Tiles=1) having a TileID 2 which is associated with Tile BBox 2; that the first child of the root node includes 1 child (#Children=1) associated with Bounding Box 3 which includes 1 tile (#Tiles=1) having a TileID 3 which is associated with Tile BBox 3; that the child of the first child of the root node has no children (#Children=0); that the second child of the root node is associated with Bounding Box 4 which includes one tile (#Tiles=1) having a TileID=4 which is associated with Tile BBox 4; that the second child of the root node has no children (#Children=0); that the third child of the root node is associated with Bounding Box 5 which includes two tiles (#Tiles=2) having a TileID 5 and TileID 6 associated with Tile BBox 5 and Tile BBox 6 respectively; that the third child of the root node has no children (#Children=0), that the fourth child of the root node is associated with a Bounding Box 6 which include one tile (#Tiles=1) having a TileID=7 which is associated with Tile BBox 7; and that the fourth child of the root node has no children (#Children=0).

The Level Of Details (LOD) file stores information regarding the total number of levels, the total number of tiles, and other data which may define the actual data as referenced in the RIF file. The following Table 2 describes an exemplary format of the LOD file:

| | |
|---|---|
| Nlevels | Integer |
| Ntiles | Integer |
| TileDatas | { FilePtr, Level, TileID }* |
| FeatureDatas | { #Features, [ FeatureID, FeatureSize, floats$^{FeatureSize}$ ]* }+ |

As shown in Table 2, the LOD file may include a "Nlevels" field, a "Ntiles" field, a "TileDatas" field, and a "FeatureDatas" field. The Nlevels field is an integer representing the total number of levels in the hierarchy. The Ntiles field is an integer representing the total number of tiles in the hierarchy. The TileDatas field is a sequence of tuples storing the location of per-tile-data, each tuple including a file-pointer field indicating a storage location within the FeatureDatas field, a level-of-detail field indicating the level of detail for the associated tile, and a tile identifier for the associated tile. The FeatureDatas field is an array defining the number of features followed by per-feature-data, the per-feature-data including a feature id, a feature size as represented by a number of floating point numbers, and the actual data.

Figure 7A:
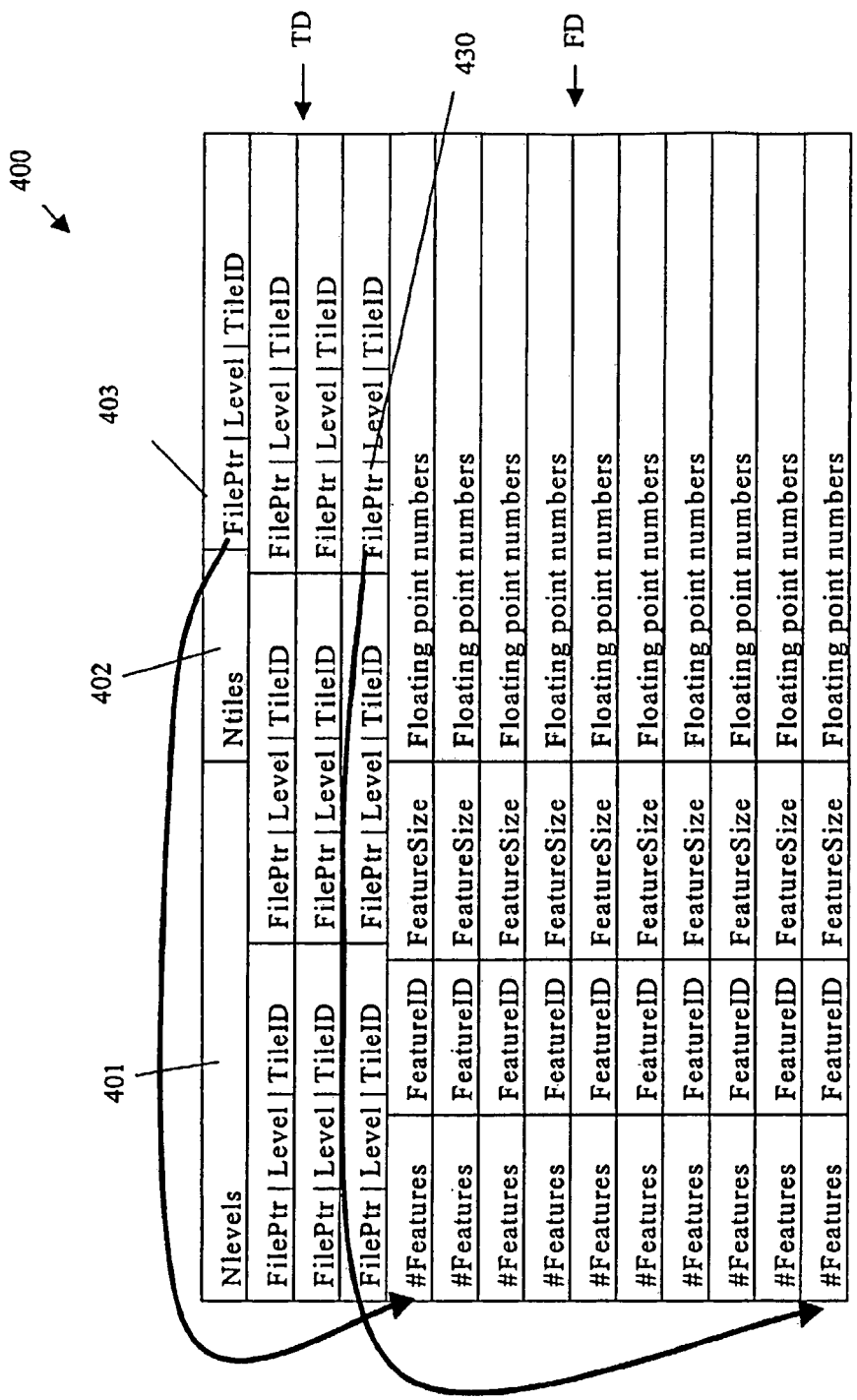
FIG. 7a shows an exemplary representation of the physical layout of the Level of Details (LOD) file within a storage medium or memory according to an embodiment of the present invention.

FIG. 7a shows an exemplary representation of the physical layout of the LOD file within a storage medium or memory. The LOD file 400 may be stored as a sequence of contiguous bytes, which may be interpreted according to the structure as defined in Table 2. For example, the Nlevels field 401 occupies the initial portion of memory, the Ntiles field 402 occupies the next portion of memory, followed by the Tile Data TD and the Feature Data FD. The Tile Data TD includes File Pointer fields (e.g., FilePtr field 403 and FilePtr field 430) to index into the Feature Data FD, thereby permitting faster access to the particular features associated with a particular tile.

Figure 7B:
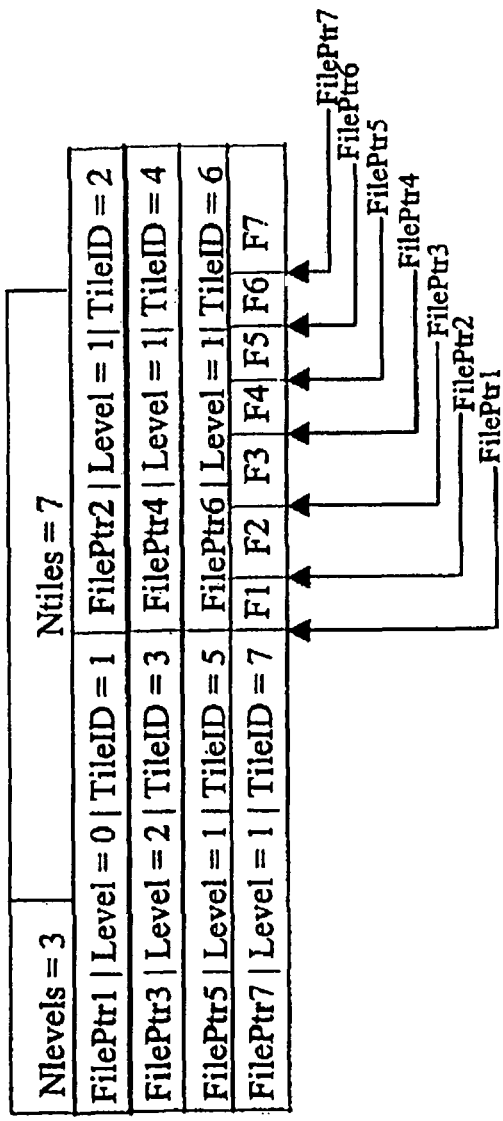
FIG. 7b shows exemplary contents of the Level of Details (LOD) file corresponding to the to the tiles TILE1 through TILE 7 of the hierarchical tree-like structure of FIG. 5b.

FIG. 7b shows exemplary contents 450 of the LOD file corresponding to the to the tiles TILE1 through TILE 7 of the hierarchical tree-like structure 260 of FIG. 5b. More specifically, contents 450 specify that the tree-like data structure has 3 levels (Nlevels=3), that tree-like structure includes a total of 7 tiles (Ntile=7); that the first tile having TileID=1 occurs at Level=0 and points via FilePtr1 to a first feature list F1; that the second tile having TileID=2 occurs at Level=1 and points via FilePtr2 to feature list F2; that the third tile having TileID=3 occurs at Level=2 and points via FilePtr3 to feature list F3; that the fourth tile having TileId=4 occurs at Level=1 and points via FilePtr4 to feature list F4; that the fifth tile having TileID=5 occurs at Level=1 and points via FilePtr5 to feature list F5; and that the sixth tile having TileID=6 occurs at Level=1 and points via FilePtr7 to feature list F7.

The framework of the RIF and LOD files may provide improved performance. An efficient paging mechanism may be supported to perform a swapping in/out of the data from the geo-database or storage medium to the local memory resources of the mobile unit such as a graphics memory, for example. Thus, the computational complexity required by the navigational system may be minimized. For instance, traversing the tree-like data structure of the RIF file may require only O(log N) computational steps where N is the number of nodes and obtaining the actual data may only require O(1) because the tile data associated with the data structure stores a file pointer to instantly locate information of the actual landmark objects. For example, a typical city representation may be stored as having 6 levels of detail, each level having 4 tiles and 4 children, each tile having an average of 50 features (e.g. building structures). Thus, such a representation may require 1365 tiles ($4^0+4^1+4^2+4^3+4^4+4^5=1365$) and 68250 features ($50\times1365=68250$). However, obtaining the actual data (i.e. the feature data) may only require traversing 6 levels and thereafter a few pointer redirections.

The framework of the RIF and LOD files may also provide fast initialization time because there may be no requirement to download all of the data into memory when the application starts, thereby reducing response time to the user. The framework of the RIF and LOD files may also provide reduced memory usage because only regions that are visible to the user need be loaded. Thus, actual memory usage may be reduced to accommodate the storage of only those features required by the user-visible regions without overwhelming the system resources. Use of the RIF and LOD files may also provide reduced pre-processing requirements because only resources within the tile need to be processed thereby eliminating the need to pre-process the data before sending it to other devices for rendering. Reduced data usage may provide faster processing time as well. In addition, use of the RIF and LOD files may also provide improved display performance of the navigational system since embedded graphics processors of the navigational system may have limited computation/rendering power. The framework of the RIF and LOD files may also be applied to other types of data and other systems as well. For example, the framework of the RIF and LOD files may be applied to other streaming protocols where resources, like the landmark objects of navigational systems, may be downloaded/transferred only when actually needed.

According to one exemplary method, at system initialization time, the RIF file is read by the scenegraph manager to create a run-time data structure in a tree-like hierarchical format to access meta data during the run-time operation of the navigation system. The RIF file is not read entirely, just the fields describing the dimension of the system (2 or 3), as well as a level of detail of the system as described by the number of levels of the tree-like data structure of the RIF. The nodes of the run-time tree-like data structure may be constructed and initialized as having no associated bounding boxes or attached tiles.

As a user navigates the system, the nodes within the run-time tree-like data structure may be dynamically added and deleted as needed by retrieving the appropriate information from the RIF file. Once a node is added, the actual data corresponding to any attached tiles may be fetched from the LOD file. In particular, the TILEID provides an index to the tile data and a corresponding file pointer provides access to the feature data. Additionally, after a user moves to a different visible region, and the viewing frustum changes, unneeded tile and feature data may be discarded thus freeing system resources.

Once the feature data is accessed, a further component of the navigational system (shown in FIG. 3), the scenegraph rendering module 60, repeatedly displays all of the objects in the scenegraph based on their geometric and appearance information. According to a particular implementation, object geometry may be broken down into a series of "primitive" elements, such as triangles or polygons. These elements may then be rendered using a graphics engine equipped with a library of three-dimensional graphics algorithms as commonly known in the art. The graphics engine may be implemented using software libraries, such as the OpenGL (Open Graphics Library) included with operating systems such as Microsoft Windows® 2000, NT, MacOS 9, and Linux. Alternatively, the graphics engine of the graphics rendering module 60 may be implemented using 3D acceleration hardware available in the form of graphics cards from various manufacturers.

The scenegraph rendering module also implements another aspect of the present invention, the use of multiresolution image synthesis which helps minimize the residency of images in local memory and the amount of computation resources used to render the images. Additionally, multiresolution synthesis improves visualization by minimizing the perceived resolution jump in going from coarse resolution texture images to fine resolution texture images as an observer moves toward, or zooms in on a portion of the field of vision.

Figure 8A:
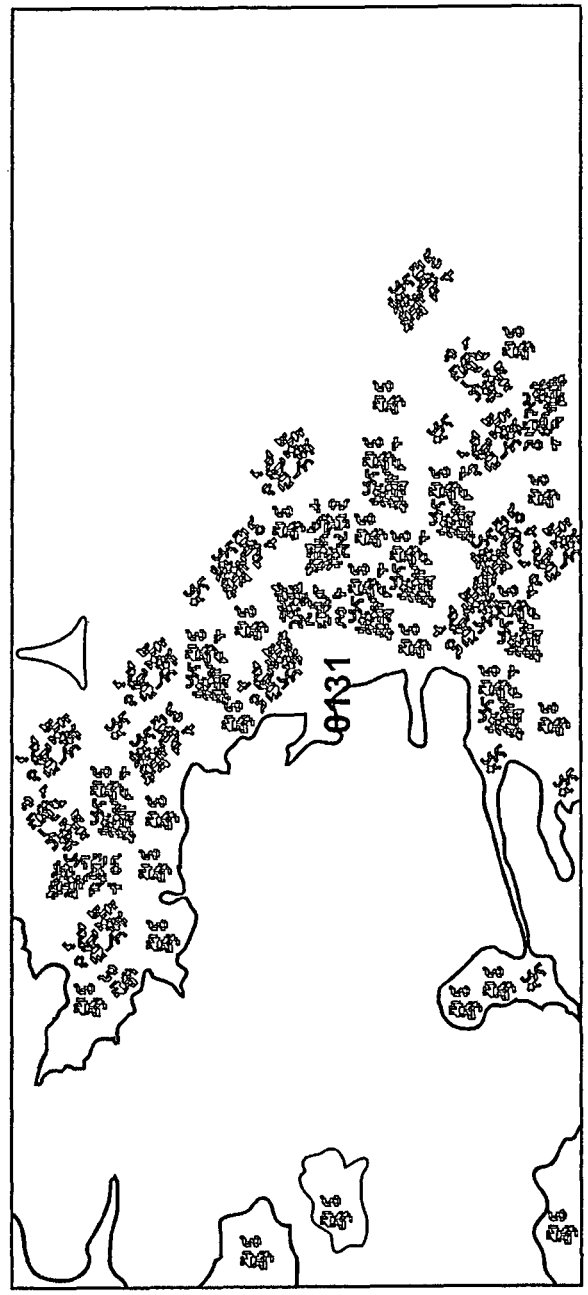
FIG. 8a shows a first blended multiresolution image according to the present invention presented as if viewed from a greatest distance.
Figure 8B:
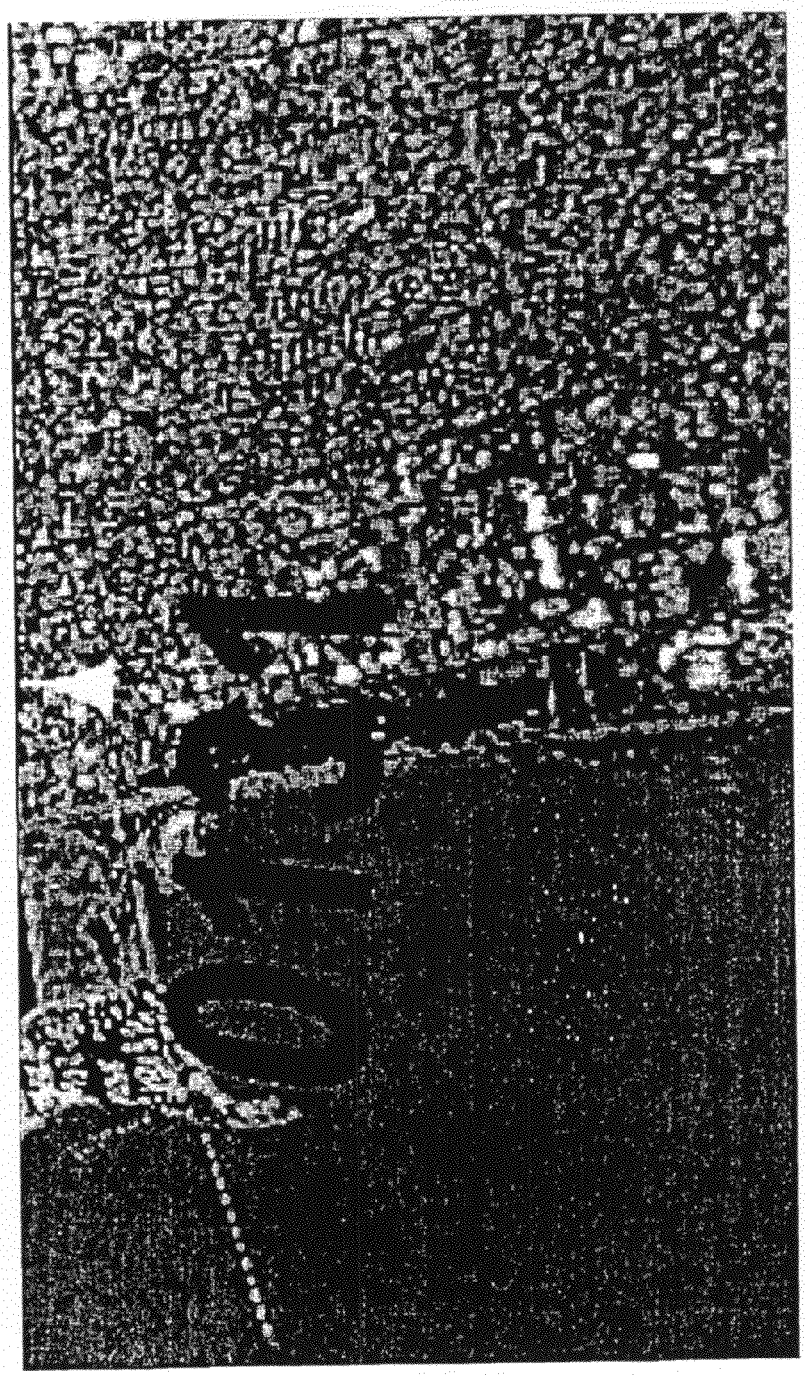

FIGS. 8*a*, 8*b*, 8*c*, and 8*d* illustrate blended multiresolution images using gray scale image aerial texture views of a coastal area at various spatial resolutions. FIG. 8*a* shows a texture blending of a coarse resolution image identified with a two digit marking ('01) and a finer higher resolution image identified with a four-digit marking ('0131). As shown, the identification for the higher resolution image ('0131) appears much smaller than the corresponding ('01) identification for the coarser image, indicating that the finer resolution image pertains to a smaller area than the coarser image and occupies only a fractional portion of the coarser image area.

Figure 8D:
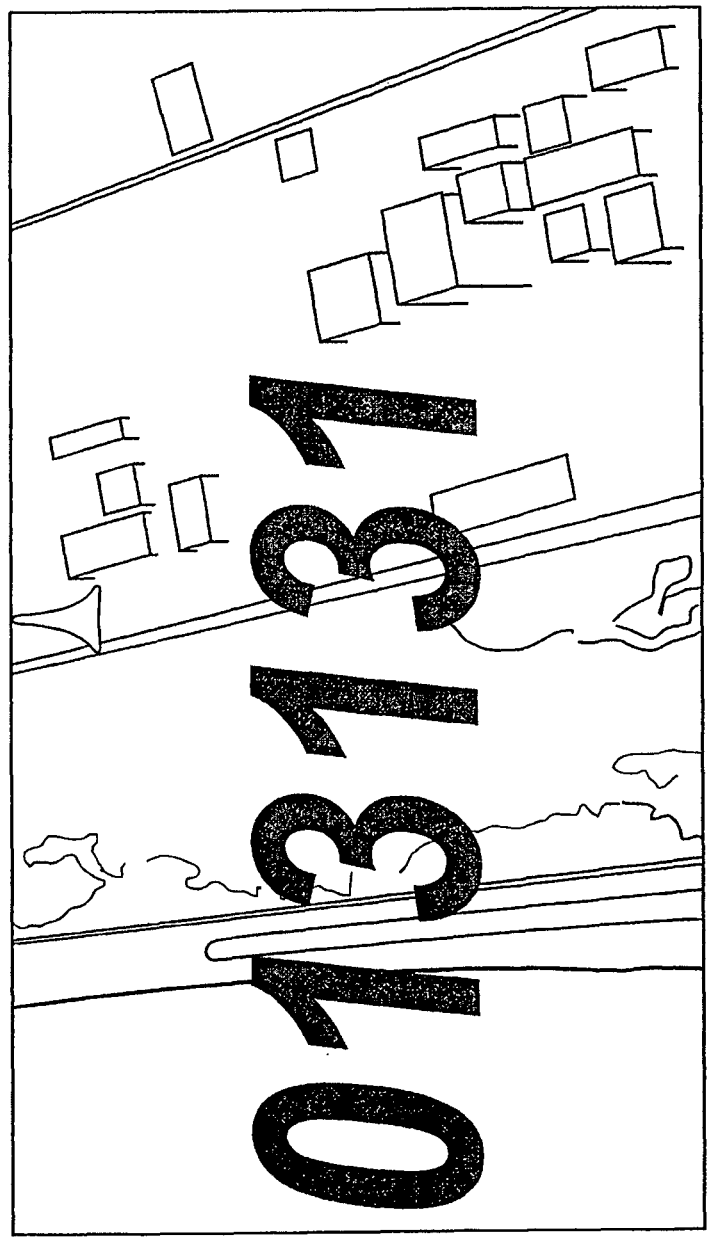
FIG. 8d shows a fourth blended multiresolution image according to the present invention as viewed from a smallest distance.

As the observer zooms in (shown in FIG. 8*b*) and observes a smaller area of the coastline, the coarser image gradually fades away and the higher level image completely covers the field of vision with the marking '0131 larger and sharply in focus. As we zoom in further, as depicted in FIG. 8*c*, the '0131 marking gradually fades away, while markings for the next higher resolution level ('013131) are shown gradually emerging along with detailed features of the area such as roads 601*a*, 601*b*. FIG. 8*d* shows the highest resolution (finest detail) texture in which the marking '013131. dominates the field of vision. In this manner, the higher resolution images are gradually brought into focus while the coarser images fade, achieving a smooth transition that appears realistic.

Figure 9:
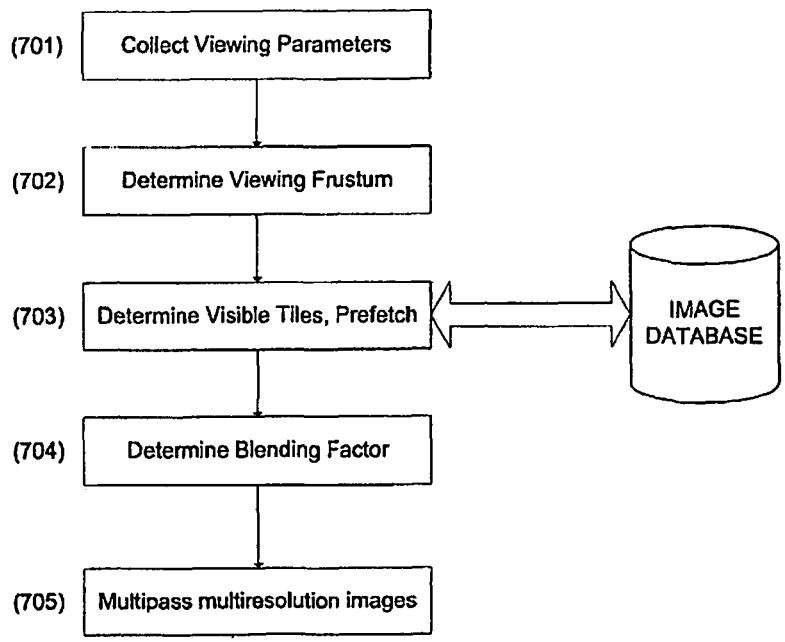
FIG. 9 is a flow diagram of an embodiment of the method for multiresolution image synthesis carried out by the navigational system of the present invention.

FIG. 9 is a flow diagram of an embodiment of the method for multiresolution image synthesis carried out by the navigational system of the present invention. At first, the system determines observer viewing parameters (701) including the observer's location, gaze direction, and possibly other computational constraints that affect the resulting display using the viewpoint control and location calculation modules as described above. The viewing frustum that corresponds to the observer's field of vision is then determined (702) from the orientation and the observer's location which together define the space the observer can view. As discussed above, based on the viewing frustum, the scenegraph manager identifies which image tiles are visible (703), generates a scenegraph, and discards tiles outside of the viewing frustum.

Due to the hierarchical nature of the data set in which each tile is stored, visible tiles within the viewing frustum or geographical area (two-dimensional bounding box) may contain multiple versions of images at differing resolutions from coarse to fine level. By pre-loading the group of tiles associated with a bounding box from an image database, the scenegraph manager keeps the images at the various different resolutions on hand for blending purposes. Keeping this limited group of images on hand in local memory for ready access does not overextend the local memory resources because the larger set of stored images that are not associated with the bounding box are not downloaded and do not consume memory or computational resources.

A blending factor is then determined (704) by applying a transfer function based on resolution level and distance to each image tile, which establishes the contribution of each image tile in the bounding box to a resulting blended image. An illustrative example of determination of the blending factor for each resolution level follows. A hierarchical object data structure for geographic points of interest contains three texture resolution levels for a particular object (or a particular geographic area), where level 0 represents the coarsest level, level 1 represents an intermediate resolution level, and level 2 represents the highest resolution level.

Figure 10:
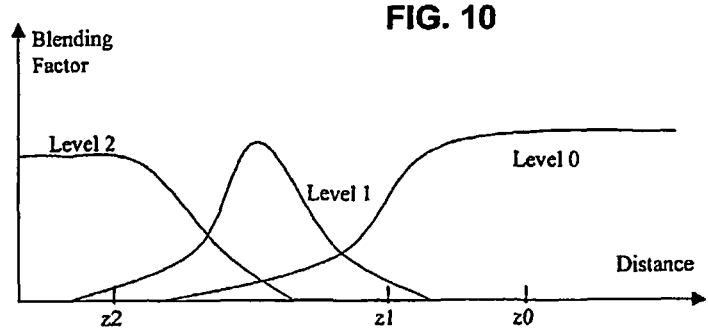
FIG. 10 shows a graph of the blending factor used for each of the three resolution levels as a function of distance.

A graph of the blending factor used for each of the three resolution levels as a function of distance is shown in FIG. 10. At a large distance from the viewed object (z0), the blending factor for resolution level 0 is at a maximum while the blending factors for levels 1 and 2 are zero, indicating that only the texture at level 0 is used to render the viewed image. As the observer moves closer to the object/area from distance z0 to distance z1, the blending factor for resolution level 0 decreases and the blending factor for resolution level one gradually increases, and is blended into the viewed image. As the observer moves toward an even closer distance z2, the blending factor for resolution level 2 gradually increases toward a maximum level, the blending factor for resolution level 1 gradually decreases after having reached a maximum level at some distance between z1 and z2, and the blending factor for resolution level 0 decreases to zero. As shown, the gradual changes in the respective blending factors for the three different resolution levels provides a continuum of resolutions at all distances across all levels of resolution.

To render the textures and images using the blending factor for each level, each geographical area is rendered in multiple passes, once for each resolution level with its respective blending factor. The resulting blend is calculated (705) at each location (i) as the sum p(i) of the pixels p(i, x) for location (i) at resolution level (x) multiplied by the blending factor b(x) for the resolution level. For n levels of resolution, the calculation is as follows:

$$p(i)=b(0)*p(i,0)+b(1)*p(i,1)+\ldots+b(n)*p(i,n)$$

The generation of blended multiresolution images provides for three-dimensional simulation with realistic textures obtained from photographs, roadmaps and satellite images and does not rely of the artificial polygonal approximations exhibited in conventional visual navigation systems. In addition, the multipass rendering minimizes disturbing visual effects caused by sudden appearance of higher degress of detail when going from coarse level to fine level. Furthermore, this method can be performed efficiently in connection with the hierarchical format for storing texture images discussed above. In particular, it is possible to provide dynamic synthesis of the images details without overwhelming computational resources by breaking the original satellite/roadmap images into tiles and then loading them on demand according to whether the texture tiles would be visible to the user in the viewing frustum.

In the foregoing description, the method and system of the present invention have been described with reference to a number of examples that are not to be considered limiting. Rather, it is to be understood and expected that variations in the principles of the method and apparatus herein disclosed may be made by one skilled in the art, and it is intended that such modifications, changes, and/or substitutions are to be included within the scope of the present invention as set forth in the appended claims.

What is claimed is:

1. A hardware computer-readable medium having stored thereon a navigation display module and a hierarchical data structure, the navigation display module being executable by a computer processor and, when executed by the processor, causing the processor to perform a navigation display using the hierarchical data structure, the hierarchical data structure comprising:
   meta data in a resource-index format (RIF); and
   level-of-detail format data including actual data of the system, the actual data being loadable on demand;
   wherein:
   the meta data includes a file location field and is interpreted by the processor executing the navigation display module as defining a plurality of nodes that are hierarchically arranged in a meta data hierarchy;
   for each of the nodes of the meta data hierarchy, the meta data is interpreted by the processor executing the navigation display module as defining the respective node by a bounding box field, a tiles field, and a number of children field;
   the number of children field of each parent node of the meta data hierarchy is interpreted by the processor executing the navigation display module as recursively defining all descendent nodes of the respective node, the respective definition of all of the descendent nodes including the respective bounding box field of the respective descendent node, the respective tiles field of the respective descendent node and the respective number of children field of the respective descendent node; and
   the recursive definition is such that, due to inclusion of the respective number of children field in the definition of each respective one of the nodes, the meta data thereby defines, for each descendent node that is a direct child of a parent node and that is being defined by the meta data before the definition of at least one other direct child node of the parent node, all descendent nodes of the respective descendent node before defining any of the at least one other direct child node.

2. The hardware computer-readable medium of claim 1, wherein the system includes a mobile navigational system.

3. The hardware computer-readable medium of claim 1, wherein the resource-index format data includes positional information of the system arranged in a hierarchical manner.

4. The hardware computer-readable medium of claim 1, wherein the resource-index format data includes a sequence of tile and bounding box information.

5. The hardware computer-readable medium of claim 1, wherein the level-of-detail format data includes resource object features in multiple levels of detail and a pointer to point to the resource object features.

6. The hardware computer-readable medium of claim 5, wherein the level-of-detail format data is arranged to optimize accessing of the resource object features.

7. The computer-readable medium of claim 1, wherein:
   the nodes of the hierarchy include a root node, a plurality of terminal leaf nodes, and a plurality of intermediate nodes that define branches from the root node to the leaf nodes; and
   the navigation display module, when executed by the processor, causes the processor to use one or more of the intermediate nodes to directly access respective portions of the actual data without use of any of the leaf nodes for display, by the processor executing the navigation display module, of structures defined by the directly accessed respective portions of the actual data.

8. A hardware computer-readable medium having stored thereon a navigation system accessible by a computer processor, the system comprising:
   data; and
   instructions that are executable by the processor, and that, when executed by the processor, are configured to cause the processor to perform a navigation method using the data, the data including:
      at least one resource object;
      meta data associated with a position of the at least one resource object; and
      actual data associated with the at least one resource object; wherein:
      the meta data includes a file location field and is interpreted by the processor executing the instructions as defining a plurality of nodes that are hierarchically arranged in a hierarchy;
      for each of the nodes of the hierarchy, the meta data is interpreted by the processor executing the instructions as defining the respective node by a bounding box field, a tiles field, and a number of children field;
      the number of children field of each parent node of the hierarchy is interpreted by the processor executing the instructions as recursively defining all descendent nodes of the respective node, the respective definition of all of the descendent nodes including the respective bounding box field of the respective descendent node, the respective tiles field of the respective descendent node and the respective number of children field of the respective descendent node; and
      the recursive definition is such that, due to inclusion of the respective number of children field in the definition of each respective one of the nodes, the meta data thereby defines, for each descendent node that is a direct child of a direct parent node and that is being defined by the meta data before the definition of at least one other direct child node of the direct parent node, all descendent nodes of the respective descendent node before defining any of the at least one other direct child node.

9. The computer-readable medium of claim 8, wherein the meta data and the actual data are arranged separately.

10. The computer-readable medium of claim 9, wherein the meta data is arranged in a resource index format and the actual data is arranged in a level-of-detail format.

11. The computer-readable medium of claim 10, wherein the level-of-detail format includes features of the at least one resource object in multiple levels of detail.

12. The computer-readable medium of claim 8, wherein:
   the nodes of the hierarchy include a root node, a plurality of terminal leaf nodes, and a plurality of intermediate nodes that define branches from the root node to the leaf nodes; and
   the instructions, when executed by the processor, cause the processor to use one or more of the intermediate nodes to directly access respective portions of the actual data without use of any of the leaf nodes for display, by the processor executing the instructions, of structures defined by the directly accessed respective portions of the actual data.

13. A hardware computer-readable medium having stored thereon a navigation system accessible by a computer processor, the system comprising:
   data; and
   instructions that are executable by the processor, and that, when executed by the processor, are configured to cause the processor to perform a navigation method using the data, the data including:
      at least one resource object;
      meta data to describe a hierarchical relationship between portions of the system and between the at least one resource object and the system; and
      actual data to describe the at least one resource object, wherein:
      the meta data and the actual data are arranged separately;
      the meta data includes a file location field and is interpreted by the processor executing the instructions as defining a plurality of nodes that are hierarchically arranged in a hierarchy;
      for each of the nodes of the hierarchy, the meta data is interpreted by the processor executing the instructions as defining the respective node by a bounding box field, a tiles field, and a number of children field;
      the number of children field of each parent node of the hierarchy is interpreted by the processor executing the instructions as recursively defining all descendent nodes of the respective node, the respective definition of all of the descendent nodes including the respective bounding box field of the respective descendent node, the respective tiles field of the respective descendent node and the respective number of children field of the respective descendent node; and
      the recursive definition is such that, due to inclusion of the respective number of children field in the definition of each respective one of the nodes, the meta data thereby defines, for each descendent node that is a direct child of a direct parent node and that is being defined by the meta data before the definition of at least one other direct child node of the direct parent node, all descendent nodes of the respective descendent node before defining any of the at least one other direct child node.

14. The computer-readable medium of claim 13, wherein:
   the nodes of the hierarchy include a root node, a plurality of terminal leaf nodes, and a plurality of intermediate nodes that define branches from the root node to the leaf nodes; and
   the instructions, when executed by the processor, cause the processor to use one or more of the intermediate nodes to directly access respective portions of the actual data without use of any of the leaf nodes for display, by the processor executing the instructions, of structures defined by the directly accessed respective portions of the actual data.

15. A hardware computer-readable medium comprising:
   meta data; and
   instructions that are executable by a computer processor, the instructions which, when executed by the processor, cause the processor to perform a navigation method using (a) the meta data and (b) actual data that are referenced by the meta data and that define structures which the processor displays when performing the navigation method;
   wherein:
      the meta data is interpreted by the processor when performing the method as defining a plurality of nodes that are hierarchically arranged in a hierarchy;
      for each of the nodes of the hierarchy, the meta data is interpreted by the processor when performing the method as defining the respective node by a plurality of fields, the plurality of fields including (a) at least one field that references a respective portion of the actual data and (b) a number of children field;

the number of children field of each parent node of the hierarchy is interpreted by the processor when performing the method as recursively defining all descendent nodes of the respective node, the respective definitions of all of the descendent nodes including (a) the respective at least one field of the respective descendent node and (b) the respective number of children field of the respective descendent node; and the recursive definition is such that, due to inclusion of the respective number of children field in the definition of each respective one of the nodes, the meta data thereby defines, for each descendent node that is a direct child of a direct parent node and that is being defined by the meta data before the definition of at least one other direct child node of the direct parent node, all descendent nodes of the respective descendent node before defining any of the at least one other direct child node.

16. The computer-readable medium of claim 15, wherein:

the nodes of the hierarchy include a root node, a plurality of terminal leaf nodes, and a plurality of intermediate nodes that define branches from the root node to the leaf nodes; and the instructions, when executed by the processor, cause the processor to use one or more of the intermediate nodes to directly access respective portions of the actual data without use of any of the leaf nodes for display by the processor of the structures defined by the directly accessed respective portions of the actual data.

17. The computer-readable medium of claim 15, wherein the meta data, including the recursive definition, are arranged as fields in a flat file.

* * * * *